United States Patent
Roese et al.

(10) Patent No.: US 10,341,458 B2
(45) Date of Patent: Jul. 2, 2019

(54) PREDICTING A SUB-SET OF RESOURCES TO BE MIGRATED TO A NEW LOCATION BASED ON A MOBILE DEVICE'S INTERACTIONS WITH RESOURCES AT A FIRST LOCATION AND A PREDICTED PERIOD OF TIME THE MOBILE DEVICE IS TO BE IN THE NEW LOCATION

(71) Applicant: EMC Corporation, Hopkinton, MA (US)

(72) Inventors: John J. Roese, Newmarket, NH (US); Stephen J Todd, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 350 days.

(21) Appl. No.: 14/318,805

(22) Filed: Jun. 30, 2014

(65) Prior Publication Data
US 2015/0381525 A1     Dec. 31, 2015

(51) Int. Cl.
*H04L 29/08*     (2006.01)
*H04W 4/02*     (2018.01)

(52) U.S. Cl.
CPC .............. *H04L 67/30* (2013.01); *H04L 67/22* (2013.01); *H04W 4/02* (2013.01)

(58) Field of Classification Search
CPC ....... H04L 47/824; H04L 67/22; H04L 67/30; H04W 4/02
USPC ....................................................... 709/226
See application file for complete search history.

(56) References Cited

U.S. PATENT DOCUMENTS

| | | | | |
|---|---|---|---|---|
| 5,572,221 A * | 11/1996 | Marlevi | ................ | H04W 28/18 342/452 |
| 6,012,052 A * | 1/2000 | Altschuler | ........ | G06F 17/30902 |
| 6,088,718 A * | 7/2000 | Altschuler | ........ | G06F 17/30902 707/E17.12 |
| 6,088,732 A * | 7/2000 | Smith | ..................... | H04L 29/06 709/226 |
| 6,185,598 B1 * | 2/2001 | Farber | .................... | G06F 9/505 709/200 |
| 6,311,065 B1 * | 10/2001 | Ushiki | .................. | H04W 36/32 342/457 |
| 7,072,845 B1 * | 7/2006 | Law | ........................ | G06Q 30/02 705/1.1 |
| 7,953,741 B2 * | 5/2011 | Shih | .................. | G06F 17/30867 707/732 |
| 7,984,049 B2 * | 7/2011 | Shih | .................. | G06F 17/30675 707/734 |
| 8,079,081 B1 * | 12/2011 | Lavrik | .................. | H04L 41/069 709/223 |
| 8,156,553 B1 * | 4/2012 | Church | .................. | G06Q 10/06 709/224 |

(Continued)

*Primary Examiner* — Daniel C. Murray
(74) *Attorney, Agent, or Firm* — Krishnendu Gupta; David Kuznick (57) ABSTRACT

A computer implemented method, system and computer program product for observing a mobile device's interaction with a set of resources in a geographic location, and creating a usage profile for the set of resources based on the mobile device's interactions with the resources. The usage profile includes a prediction of a subset of resources that will be used at a second geographic location in order to migrate the subset of resources to the second geographic location when the mobile device moves to the second geographic location.

20 Claims, 8 Drawing Sheets

(56) References Cited

U.S. PATENT DOCUMENTS

| | | | |
|---|---|---|---|
| 8,180,782 B2* | 5/2012 | Shih | G06F 17/30867 707/748 |
| 8,312,004 B2* | 11/2012 | Shih | G06F 17/30867 707/708 |
| 8,316,098 B2* | 11/2012 | Luna | G06F 9/5016 709/216 |
| 8,326,793 B1* | 12/2012 | Bowers | G06F 9/50 706/45 |
| 8,380,179 B2* | 2/2013 | Appaji | H04M 1/72586 455/418 |
| 8,407,335 B1* | 3/2013 | Church | G06F 11/0709 709/218 |
| 8,429,630 B2* | 4/2013 | Nickolov | G06F 9/4856 717/110 |
| 8,468,197 B2* | 6/2013 | Shih | G06F 17/30867 707/734 |
| 8,483,375 B2* | 7/2013 | Dhara | H04L 12/1818 370/260 |
| 8,484,343 B2* | 7/2013 | Shih | G06F 17/30867 705/26.8 |
| 8,489,615 B2* | 7/2013 | Dhara | H04L 12/1818 707/748 |
| 8,645,529 B2* | 2/2014 | Doddavula | G06F 9/5072 709/223 |
| 8,832,003 B1* | 9/2014 | Bowers | G06F 9/50 706/12 |
| 8,909,749 B2* | 12/2014 | Branch | G06F 9/4856 709/217 |
| 8,918,787 B2* | 12/2014 | Ostojic | G06F 9/4818 718/103 |
| 8,984,058 B2* | 3/2015 | A Hummaida | H04L 67/2847 709/203 |
| 9,009,294 B2* | 4/2015 | Dawson | G06F 9/5072 709/224 |
| 9,077,863 B2* | 7/2015 | Patel | G08B 13/19641 |
| 9,135,048 B2* | 9/2015 | Klein | G06F 9/45558 |
| 9,143,460 B2* | 9/2015 | Dhara | H04L 12/1818 |
| 9,152,685 B2* | 10/2015 | Kavuri | G06F 9/50 |
| 9,167,591 B2* | 10/2015 | Egner | H04W 72/085 |
| 9,210,714 B2* | 12/2015 | Egner | H04W 4/028 |
| 9,438,648 B2* | 9/2016 | Asenjo | H04L 65/403 |
| 9,614,958 B2* | 4/2017 | Radermacher | H04M 3/42348 |
| 9,629,076 B2* | 4/2017 | Shaw | H04W 48/18 |
| 9,961,625 B2* | 5/2018 | Shaw | H04W 48/18 |
| 10,048,979 B2* | 8/2018 | Vincent | G06F 9/45558 |
| 2002/0198991 A1* | 12/2002 | Gopalakrishnan | G06F 17/30902 709/225 |
| 2004/0192342 A1* | 9/2004 | Ranganathan | H04L 65/4092 455/456.1 |
| 2004/0248583 A1* | 12/2004 | Satt | H04L 12/5695 455/452.2 |
| 2007/0150599 A1* | 6/2007 | Neogi | G06F 9/5061 709/227 |
| 2008/0097986 A1* | 4/2008 | Shih | G06F 17/30867 |
| 2008/0097987 A1* | 4/2008 | Shih | G06F 17/30867 |
| 2008/0098058 A1* | 4/2008 | Shih | G06F 17/30867 709/201 |
| 2008/0155086 A1* | 6/2008 | Jensen | G06F 9/5083 709/223 |
| 2008/0155386 A1* | 6/2008 | Jensen | G06F 9/5083 715/201 |
| 2008/0242286 A1* | 10/2008 | Appaji | H04M 1/72586 455/418 |
| 2009/0029692 A1* | 1/2009 | Radermacher | H04M 3/42127 455/418 |
| 2009/0094649 A1* | 4/2009 | Patel | G08B 13/19641 725/86 |
| 2009/0276771 A1* | 11/2009 | Nickolov | G06F 9/4856 717/177 |
| 2011/0010518 A1* | 1/2011 | Kavuri | G06F 9/50 711/165 |
| 2011/0131224 A1* | 6/2011 | Bodin | G06Q 30/02 707/758 |
| 2011/0145392 A1* | 6/2011 | Dawson | G06F 9/5072 709/224 |
| 2011/0208756 A1* | 8/2011 | Shih | G06F 17/30867 707/751 |
| 2011/0228922 A1* | 9/2011 | Dhara | H04L 12/1818 379/202.01 |
| 2011/0231396 A1* | 9/2011 | Dhara | H04L 12/1818 707/731 |
| 2011/0231409 A1* | 9/2011 | Dhara | H04L 12/1818 707/748 |
| 2011/0231773 A1* | 9/2011 | Dhara | H04L 12/1818 715/738 |
| 2011/0238755 A1* | 9/2011 | Khan | G06Q 50/01 709/204 |
| 2011/0265089 A1* | 10/2011 | Ostojic | G06F 9/4818 718/103 |
| 2011/0270916 A1* | 11/2011 | Shih | G06F 17/30867 709/203 |
| 2011/0296505 A1* | 12/2011 | Perez | G06F 3/011 726/6 |
| 2012/0023223 A1* | 1/2012 | Branch | G06F 9/4856 709/224 |
| 2012/0023226 A1* | 1/2012 | Petersen | H04W 4/18 709/224 |
| 2012/0089726 A1* | 4/2012 | Doddavula | H04L 67/34 709/224 |
| 2012/0155426 A1* | 6/2012 | Verma | H04W 36/0033 370/331 |
| 2013/0024508 A1* | 1/2013 | Sathish | H04L 67/34 709/204 |
| 2013/0275591 A1* | 10/2013 | Kruglick | H04L 41/28 709/225 |
| 2013/0304924 A1* | 11/2013 | Dhara | H04L 12/1818 709/226 |
| 2014/0032741 A1* | 1/2014 | Lau | H04L 67/1095 709/224 |
| 2014/0040343 A1* | 2/2014 | Nickolov | G06F 9/4856 709/201 |
| 2014/0082614 A1* | 3/2014 | Klein | G06F 9/45558 718/1 |
| 2014/0094208 A1* | 4/2014 | Egner | H04W 72/085 455/513 |
| 2014/0099967 A1* | 4/2014 | Egner | H04W 4/028 455/452.2 |
| 2014/0115514 A1* | 4/2014 | Hackborn | G06F 3/0481 715/771 |
| 2014/0172796 A1* | 6/2014 | Kavuri | G06F 9/50 707/634 |
| 2014/0185581 A1* | 7/2014 | Senarath | H04W 36/0083 370/331 |
| 2014/0280485 A1* | 9/2014 | A Hummaida | H04L 67/1097 709/203 |
| 2014/0337429 A1* | 11/2014 | Asenjo | H04L 65/403 709/204 |
| 2015/0031326 A1* | 1/2015 | Begin | H04W 24/08 455/405 |
| 2015/0046516 A1* | 2/2015 | Tsuchida | H04L 67/42 709/203 |
| 2015/0254248 A1* | 9/2015 | Burns | H04L 67/16 707/749 |
| 2015/0254320 A1* | 9/2015 | Cowling | G06F 17/30581 707/613 |
| 2015/0339197 A1* | 11/2015 | Kavuri | G06F 9/50 707/645 |
| 2016/0005005 A1* | 1/2016 | Dhara | H04L 12/1818 705/7.19 |
| 2016/0044692 A1* | 2/2016 | Egner | H04W 72/085 370/330 |
| 2016/0150467 A1* | 5/2016 | Shaw | H04W 48/18 370/329 |
| 2016/0173631 A1* | 6/2016 | McKay | H04L 67/22 709/203 |
| 2016/0330291 A1* | 11/2016 | Asenjo | H04L 65/403 |

(56) References Cited

U.S. PATENT DOCUMENTS

2017/0215138 A1\* 7/2017 Shaw ................... H04W 48/18
2018/0074843 A1\* 3/2018 Smith ................. G06F 9/45558
2019/0004859 A1\* 1/2019 Bowers .................... G06F 9/50

\* cited by examiner

PREDICTING A SUB-SET OF RESOURCES TO BE MIGRATED TO A NEW LOCATION BASED ON A MOBILE DEVICE'S INTERACTIONS WITH RESOURCES AT A FIRST LOCATION AND A PREDICTED PERIOD OF TIME THE MOBILE DEVICE IS TO BE IN THE NEW LOCATION

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to Application and Information Movement in a Cloud Environment.

RELATED APPLICATIONS

This Application is related to U.S. patent application Ser. No. 14/320,001 entitled "CONTENT FABRIC FOR A DISTRIBUTED FILESYSTEM", Ser. No. 14,320,069 entitled "CONVERGED INFRASTRUCTURES COMPRISING DISAGGREGATED COMPONENTS", Ser. No. 14/319,889 entitled "SOFTWARE OVERLAYS FOR DISAGGREGATED COMPONENTS", Ser. No. 14/318,831 entitled "CLOUDBOOK", and Ser. No. 14/319,773 entitled "MIGRATING PRIVATE INFRASTRUCTURE SERVICES TO A CLOUD", filed on even date herewith, which are hereby incorporated herein by reference in their entirety.

BACKGROUND

As it is generally known, "cloud computing" typically refers to the use of remotely hosted resources to provide services to customers over one or more networks such as the Internet. Resources made available to customers are typically virtualized and dynamically scalable. Usually, cloud computing services may include any specific type of application. Conventionally, the software and data used to support cloud computing services are located on remote servers owned by a cloud computing service provider. Recently, use of the cloud computing service model has been growing due to the increasing availability of high bandwidth communication, making it possible to obtain response times from remotely hosted cloud-based services similar to those of services that are locally hosted.

Further, data storage demands continue to grow at a high rate. One area of growth that is testing information technology infrastructure is the billions of users and millions of applications supported in modern computing. As consumers and businesses alike adopt mobile devices, social platforms, cloud storage, and big data, the dynamics of how we store and protect data is changing as well. Some of these new platforms can be less trusted, less secure, and less resilient than the private cloud infrastructures operated by many enterprises. These private clouds have a set of hardened and reliable infrastructure services that make the data center trusted, secure, and resilient.

However, there are benefits of storing, accessing, and utilizing data from the public cloud. For example, cost, flexibility, access to markets, and market trends all may make public clouds an attractive alternative for some storage needs and some applications. However, if consumers and businesses alike want to transition or migrate sensitive data, or data that must have a guaranteed level of resiliency, they need assurances that their needs will be met. Therefore, there exists a need to provide the same infrastructure services that make the private cloud trusted, secure, and resilient, in a public cloud environment.

SUMMARY

A computer implemented method, system and computer program product comprising observing a mobile device's interaction with a set of resources, and creating a usage profile for the set of resources based on the mobile devices interactions with the resources; wherein the resources are ranked by the type an frequency of interactions with the mobile device; wherein the usage profile dictates what resources of the set of resources are to be migrated to a new location when the mobile device moves to a new location.

DETAILED DESCRIPTION

Usually, a mobile device connects to a network access point. Typically, if this is a cellular type device, this may be cellular tower. Conventionally, other common mobile connections may be through a wireless local area network. Currently, when a mobile device moves across geographies, the mobile devices data, data service, and processing capability may not move with the user in a granular way. Typically, mobile users run dozens of applications that can access thousands upon thousands of content depots. Usually, when these users travel, their access to the content may suffer due to latencies fetching (or storing) content to the IT infrastructure.

Generally, when a mobile device changes geographies, such as traveling from Boston to Beijing, the device may only have access to a data connection, which may connect back to where the mobile device's data and services are stored. Usually, such as on a plane flight, the device may exit connectivity in a first location and reconnect to a network in a second geographically disparate location. Typically, this would not allow the device's data or service to be migrated to the second location before the device turns on in the second location. Conventionally, once the device is switched on in a second location there is usually not a way to migrate specific data or services the user may want to use in the new location or even predictively make processing power available to the use. Usually, this leads to a degradation of service quality for a user. Sometimes, after a period of time in a second location, the experience for a user may increase as data may begin to be locally cached at the new location.

Typically, a mobile user working at corporate headquarters in the United States may leverage a variety of mobile applications from their mobile tablet or phone such as corporate email, personal email, online banking, personal social media sites (Facebook), content sharing of presentations and documents (e.g. Syncplicity). Usually, performance in the user's home territory is optimized because generated content is typically stored in a geographically close data center. Conventionally, however, when the mobile device connects to the same service provider in a different geography, the user experiences (or the service providers experience) a number of different problems.

Generally, performance is sluggish due to latencies extending back to the home geography. Usually, service providers are faced with "moving everything" closer to the user, unnecessarily using up network bandwidth between data centers and storage space at the remote data center. Typically, mobile users on multi-hop journeys can further aggravate data migration problems if they do not remain in their locale for a significant amount of time. Conventionally, there is no way for a service provider to prioritize which files or content to move first based on the needs of the mobile user. Usually, there is no way to determine if the user behavior for mobile apps is different when travelling and therefore certain content can be left behind and not moved.

In some embodiments, the current disclosure may enable leveraging per-user mobile application access patterns to trigger content migration for employees connecting into geographically distributed data centers. In an embodiment, the current disclosure may make a prediction of what data or services a user will use in a new location and migrate those service or data when the user goes to a new location. In some embodiments, the current disclosure may enable predictive migration of data and or services to have the services and/or data migrated to a second location by predicting both what services/data the device will use and where the device will be. In at least one embodiment, the predicted location on the device may be based on information on the device.

In most embodiments, information may be extracted from applications on a mobile device. In certain embodiments, location data such as calendar entries, e-mails, social network information, or agendas may provide the ability to predict where a device will be. In further embodiments, location data in the device may be used to predict a future device location. In still further embodiments, different types of commerce, such as a hotel, airplane, or rental car bookings may be used to predict s future location or future locations of the mobile device. In other embodiments, by observing application behavior of the device when it is in different locations, location based data/service prediction may be enabled. In further embodiments, the current disclosure may enable prediction of use of processing resources and may make those resources available to the user when they travel to a new location. In still further embodiments, prediction of what resources may be used by a mobile device may be based on the time of day.

In certain embodiments, a mobile device may have an application that creates a log to enable prediction. In other embodiments, a connection point may monitor the device to create a log to enable prediction. In some embodiments, a log may be used to create a profile that may enable specific data or services to be moved to the location based on the profile. In at least some embodiments, a profile may be time based, moving different data/services, to the second location at different times. In one embodiment, computer based reasoning may be performed on a profile or log to determine when the user needs what services. In certain embodiments, the log may be a "mobile application usage log" (MAUL) that may keep track of the access patterns for every application on a mobile device, including: application name, time of open, amount of activity, and geographic location while using the application. In certain embodiments, a mobile device's interaction with social applications may be used to enhance data availability such as when a mobile device interacts with other mobile devices that may shift location as well. In further embodiments, resource movement for a mobile device may be triaged with the movement of other mobile devices, such as those on a business team attending a meeting together.

In some embodiments, storage of mobile content (e.g. HTTP put) may occur with content being accompanied by one or more attributes from an access file (e.g. which app is storing the content and where the mobile user was located when it stored the content). In at least some embodiment, the request for mobile content (e.g. HTTP get, or HDFS query operation) may result in the infrastructure capturing and storing additional MAUL information within the data center. MAUL information for a particular user may be stored in a variety of places, including data centers and mobile devices. In many embodiments, log information may be versioned and shared/sent between data centers and mobile devices in an "eventually consistent" manner. In other embodiments, connection of mobile devices in a new location may result in leveraging a log to prioritize movement of the most important/relevant data, and the leaving behind of data not likely to be needed. In further embodiments, movement may be linked with "calendar flight itineraries" to recognize when a user is only in a new location for a short period of time (airport flight stopover) and adjust content migration accordingly. In still further embodiments, movement software may "learn" from incorrect movement policies by noticing that migration guesses resulted in moving content that was never accessed by the user in their new location (e.g. they never read any engineering specs but they checked their social network more frequently when travelling).

In most embodiments, intelligent movement of data and services may create quicker and better access to the data while minimizing bandwidth usage. In further embodiments, a profile may be created by monitoring the mobile device without putting software on the mobile device. In other embodiments, a log on a mobile device may periodically be moved to a service provider from the mobile device to the service provider for use. In certain embodiments, before a geographic based profile is established, a default profile may be used in other geographic locations. In many embodiments herein, the term resource or resources may refer to data, services, and/or processing power accessed by a mobile device.

Figure 1:
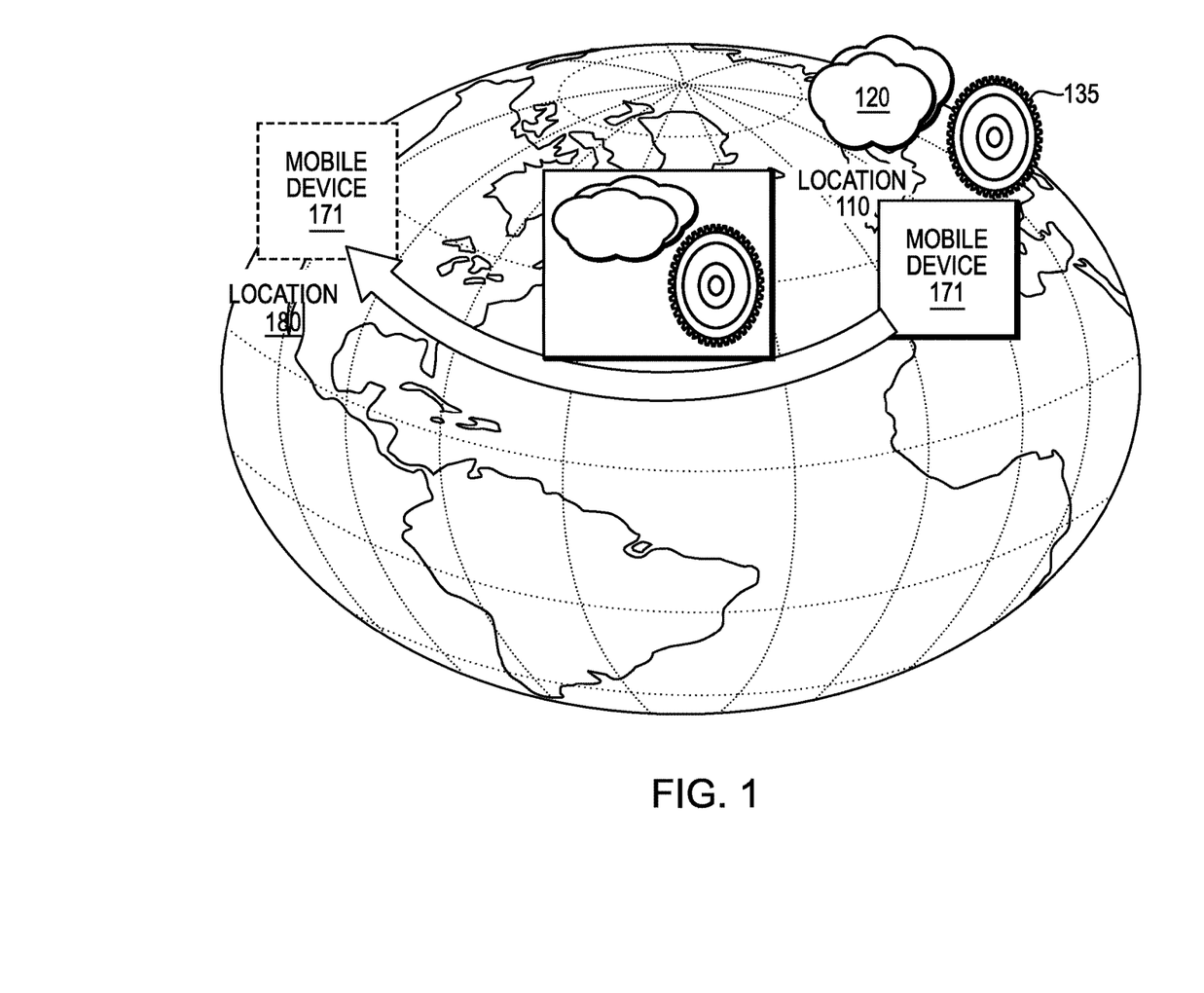
FIG. 1 is a simplified illustration of a mobile device moving from a first location to a second location, in accordance with an embodiment of the present disclosure.

Refer now to the embodiment of FIG. 1, which illustrates a mobile device connected to an access device in a first location. In the example embodiment of FIG. 1, data 120 and services 135 are associated with mobile device 171, which is at location 110. If mobile device 171 were to change to location 180, then it would be preferable for some of data 120 and services 135 to be available at location 180. As well it may be beneficial to prioritize which services and data are available at location 180 to minimize bandwidth and overhead associated with the move of the data and services.

Figure 2:
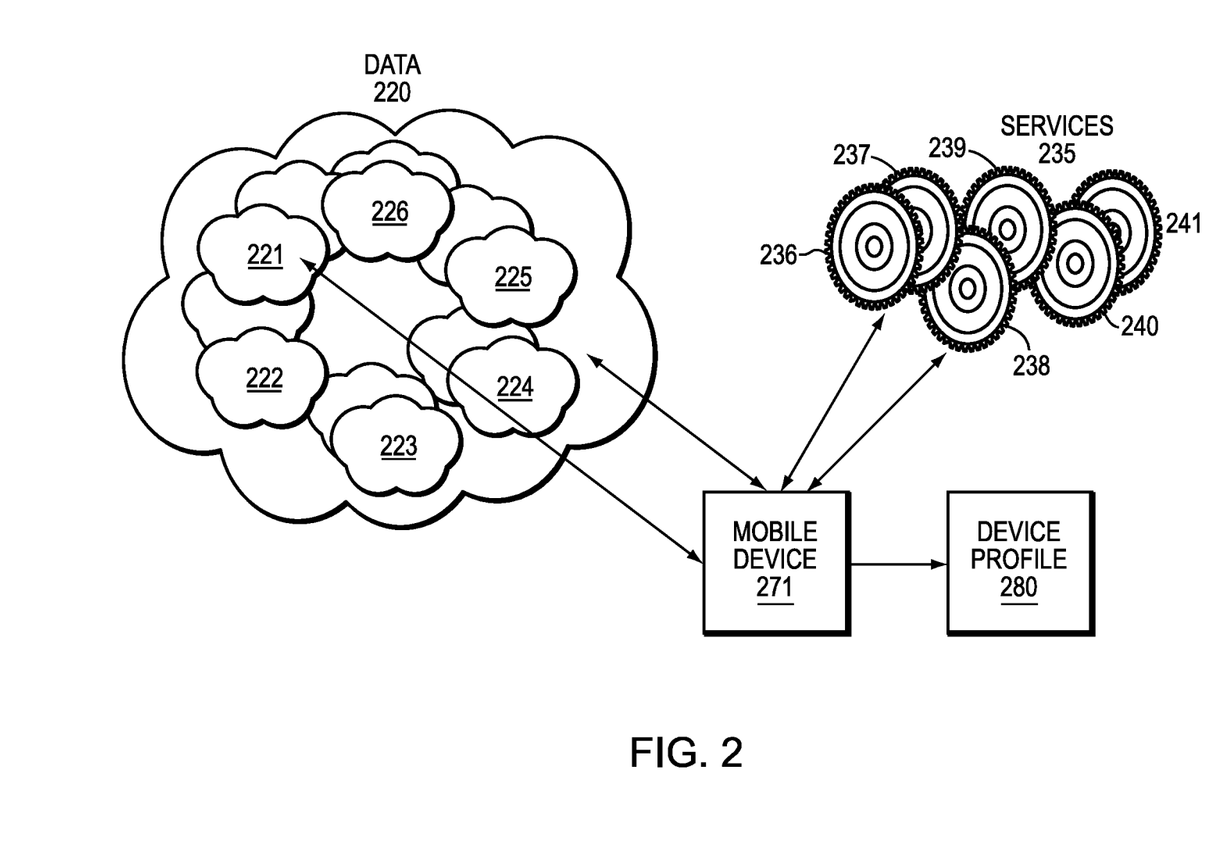
FIG. 2 is a simplified illustration of a mobile device accessing data and services and a device profile, in accordance with an embodiment of the present disclosure.

Refer now to the example embodiment of FIG. 2. In the example embodiment of FIG. 2, Mobile device 271 may access data cloud 220 and services 235. Data cloud 220 may be made up of many smaller data clouds such as clouds 221, 222, 223, 224, 225, and 226. Similarly, services 235 may be made up of services 236, 237, 238, 239, 240, and 241. Mobile device 271 may use data from the clouds of data 220 differently and may use the services of services 235 differently.

Figure 3:
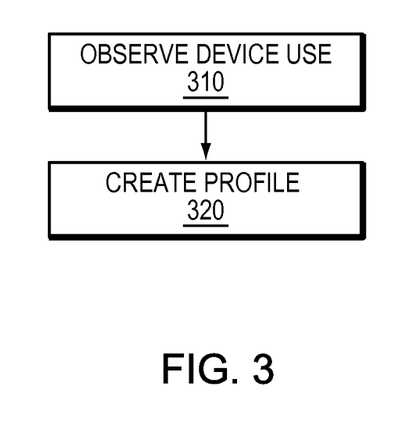
FIG. 3 is a method for creating a profile, in accordance with an embodiment of the present disclosure.

Refer now as well to the example embodiment of FIG. 3. The access patterns to data clouds 221, 222, 223, 224, 225, and 226 of data cloud 220 may be observed (step 310). The access patterns to services 236, 237, 238, 239, 240, and 241 may be observed (step 310). Based on the access patterns, device profile 280 may be created (step 320). Device profile 280 denotes that certain data clouds, such as cloud 221 and 225 are accessed often and need to have high availability to mobile device 271. As well, device profile 280 denotes that data cloud 226 is rarely accessed during the normal work day but is regularly accessed outside of work hours. Similarly, it is noted that service 238 is continually used throughout the day while service 240 is used during work hours but not afterwards. Services 236 and 237 are rarely accessed. Device profile 280 may also be indexed to a particular geographic location.

Figure 4:
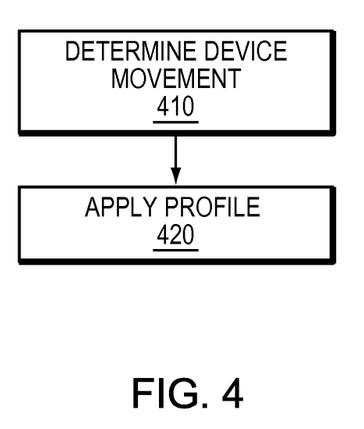
FIG. 4 is a method for applying a profile, in accordance with an embodiment of the present disclosure.

Refer now to the example embodiments of FIGS. 1, 2, and 4. Device 171 has been observed to have moved from location 110 to 180 (step 410). Device profile 280 may be applied to device 171 to migrate services to location 180 based on the profile (step 420). For example, the first time that device 171 is moved to location 180, clouds 221 and 225 may be migrated with a high priority to location 180 along with service 238 and service 240. Other services such as services 236 and 237 may not be migrated to location 180.

Refer now as well to the example embodiment of FIG. 3. After device 171 has been moved to location 180, the device usage in this second geographical location 180 will be observed (step 310). Based on this observed usage, device profile 180 will be updated to note if different services are used at the second location. Thus, the second time that device 171 moves to location 180 or a different geographic location than location 110, the refined profile may dictate that different services and data be moved with different priorities in the second location. In alternative embodiments, a second device profile may be created and used in different geographic locations.

In a particular embodiment, a user may heavily use certain services such as work e-mail and facebook access in a first location, such as a home work environment. In a second location, such as an office abroad in China, the user may heavily use certain services, such as work e-mail during all hours and a communication application, such as VIBER outside of work hours. In this particular embodiment, a device profile may, after observing the user travel between these geographic locations, that the data and services with work e-mail should be transferred with the user between the first location and second location with a high priority. Similarly, the device profile may dictate that the data and services associated with facebook should not be transferred to the China location, but additional processing power should be available to make VIBER accessible at the second location. Through the use of these location based profiles, data and service transferred can be prioritized to minimize bandwidth use.

Figure 5:
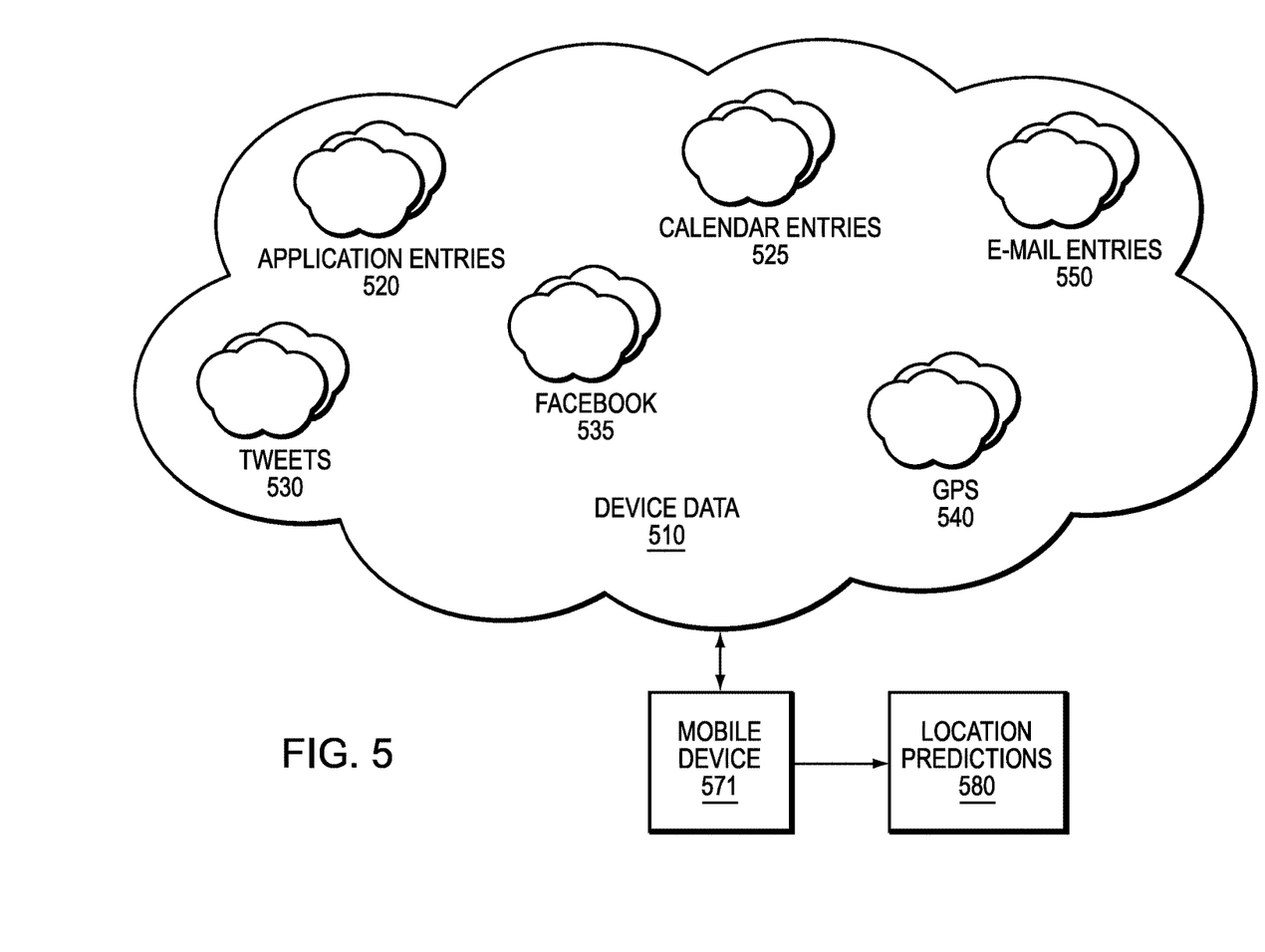
FIG. 5 is a simplified illustration of mobile device data and services that may be useful for creating location predictions, in accordance with an embodiment of the present disclosure.

Refer now to the example embodiment of FIG. 5, which illustrates sample data and services mobile device 571 has that are used to predict the future location of mobile device 571. Tweets 530 or facebook entries 535 may provide explicit real information as to where the mobile device is traveling. For example an entry that the user of mobile device 571 is now going to work indicates that the mobile device is moving. Calendar entry 525 denotes that a meeting is to occur in another geographic location. E-mail entries 550 indicate that the user has booked a flight to and hotel in Finland on a certain data. Application entries 520 indicate that user has booked a restaurant reservation for a given time in a different geographic location.

Figure 6:
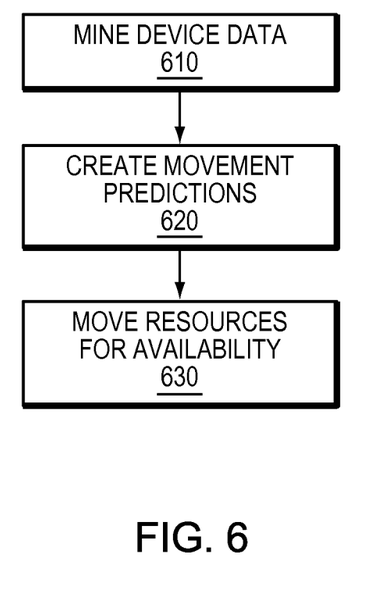
FIG. 6 is a method for creating prediction of a location of the mobile device, in accordance with an embodiment of the present disclosure.

Refer as well to the example embodiment of FIG. 6. Device data 510 of mobile device 571 may be mined (step 610). Location predictions 580 based on the device data 510 may be created (step 620). Based on location predictions 580, data services and processing power may be moved from a first geographic location to a second geographic location so that these resources are available (step 630) to the mobile device when it arrives in a new geographic location.

In a particular embodiment, it may be mined from a device that a user has bought a plane ticket from Boston to Shanghai for a particular date. In this embodiment, there would not be a way to track the movement of the mobile device as it would be shut off during flight. In this embodiment, the location prediction may enable data and services to be migrated from Boston to Shanghai based on a profile that has been developed for the user in Shanghai. If no profile has been developed for Shanghai, then data and services may be transferred to Shanghai based on a default profile. In certain embodiments, a location prediction may also dictate when services and data are no longer needed at a different geographic location, such as the date of the return for the plane ticket.

In a different embodiment, a usage profile may dictate that a user leverages compute power when in a particular geographic location. In this embodiment, a mobile device may use intensive compute when not in a home work location. In this embodiment, the mobile device may upload video content, such a marketing data, and real time data analytics may be performed on this video content. In this embodiment, when a user travels to the geographic location, compute resource may be made available to the mobile device. In further embodiments, mobile device data may indicate that other mobile devices, such as of business associates, are traveling to the same location as the mobile device and resources may be migrated to ensure that the mobile devices are able to work together well, such as to collaborate on an application.

Figure 7:
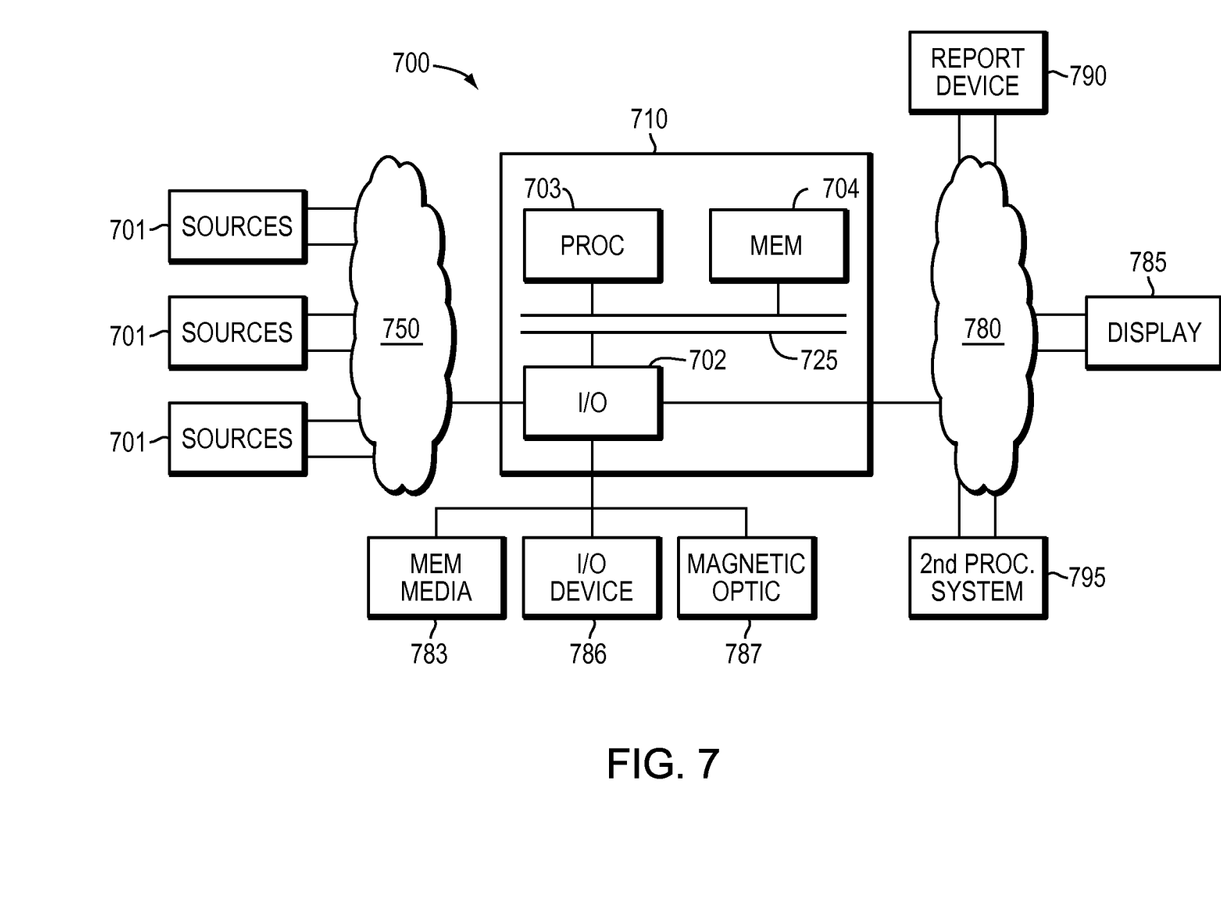
FIG. 7 is an example of an embodiment of an apparatus that may utilize the techniques described herein, in accordance with an embodiment of the present disclosure.
Figure 8:
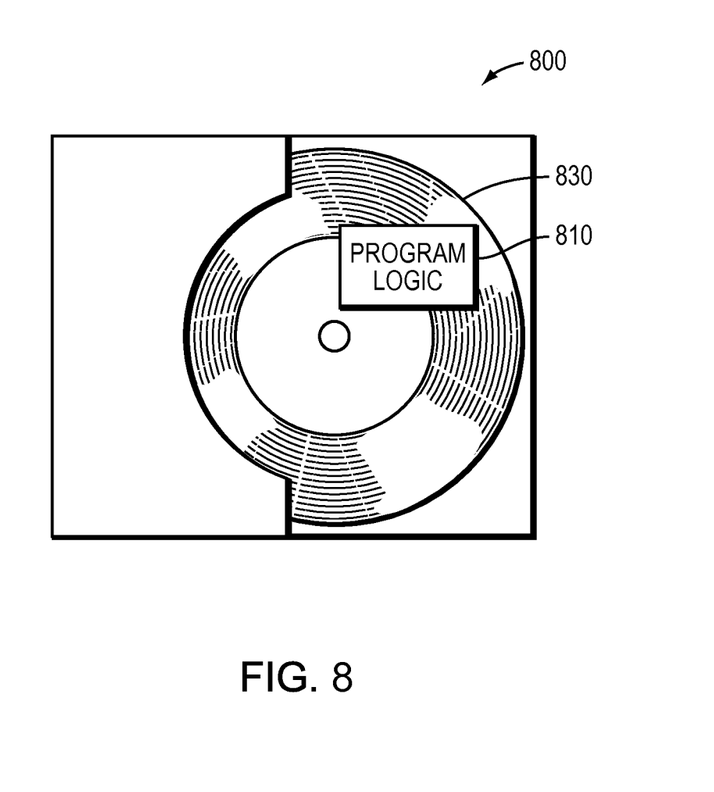
FIG. 8 is an example of an embodiment of a method embodied on a computer readable storage medium that may utilize the techniques described herein in accordance with an embodiment of the present disclosure.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as the computer of FIG. 7, the machine becomes an apparatus for practicing the invention. When implemented on one or more general-purpose processors, the program code combines with such a processor 703 to provide a unique apparatus that operates analogously to specific logic circuits. As such a general purpose digital machine can be transformed into a special purpose digital machine. FIG. 8 shows Logic 2210 embodied on a computer-readable medium 820 as shown, and wherein the Logic is encoded in computer-executable code configured for carrying out the reservation service process of this invention and thereby forming a Computer Program Product 800. The Logic 810 may be the same logic 740 on memory 704 loaded on processor 703. The program logic may also be embodied in software modules, as modules, or as hardware modules. The program logic may be run on one or more physical or virtual processors.

The logic for carrying out the method may be embodied as part of the system described below, which is useful for carrying out a method described with reference to embodiments shown in, for example, FIG. 3, FIG. 4 and FIG. 6. For purposes of illustrating the present invention, the invention is described as embodied in a specific configuration and using special logical arrangements, but one skilled in the art will appreciate that the device is not limited to the specific configuration but rather only by the claims included with this specification.

A detailed description of one or more embodiments of the invention is provided above along with accompanying figures that illustrate the principles of the invention. The invention is described in connection with such embodiments, but the invention is not limited to any embodiment. The scope of the invention is limited only by the claims and the invention encompasses numerous alternatives, modifications, and equivalents. Numerous specific details are set forth in the above description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured. Accordingly, the above implementations are to be considered as illustrative and not restrictive, and the invention is not to be limited to the details given herein, but may be modified within the scope and equivalents of the appended claims.

What is claimed is:

1. A computer implemented method for use in migration of resources for a mobile device across a cloud, the method comprising:
    observing a mobile device's interaction, in a first location associated with a first data center, with a set of resources; wherein the set of resources include mobile data, data service, and processing capability;
    recording the mobile device's interaction in a log on the user device;
    creating a usage profile using the log for the set of resources based on the mobile device's interactions, in the first location, with the resources; wherein the resources are ranked by the type and frequency of interactions with the mobile device; wherein the usage profile includes a prediction of a sub-set of the set of resources will be used at a second location associated with a second data center; wherein the usage profile dictates that the sub-set of the set of resources are to be migrated to a new location when the mobile device moves to the second location; wherein the usage profile includes information about what resources may be left behind and not transferred to the second location; wherein the usage profile includes information about the time frames when a user accesses a specific location; wherein the usage profile includes information when the mobile device is predicted to be in a particular new location for a period of time where the user profile dictates that not all of the set of resources should be transferred to the particular new location based on the period of time; and
    sharing the log between the mobile device and the first and second data centers in an eventually consistent manner.

2. The computer implemented method of claim 1 further comprising:
    determining the mobile device has moved to a new location; and
    applying the usage profile to enable intelligent migration of resources of the set of resources to the new location; wherein intelligent migration prioritizes resources based on which of the resources are predicted to be used at the new location; and migrating the resources that have been prioritized based on predicted use; wherein the resources further includes a set of services and a set of data;
    wherein resource movement for the mobile device is triaged with movement of other mobile devices determined to be moving to the same location.

3. The computer implemented method of claim 1 further comprising:
    mining the applications on the mobile device for data that is associated with the future location of the mobile device;
    analyzing the mined data to determine a future location of the mobile device; and
    migrating data associated with applications predicted to be used at the future location according to the usage profile to the future location of the mobile device before the mobile arrives at the future location;
    recording the mobile device's interaction, in the second location, with the set of resources in the log; and
    revising the user profile based on recorded interaction in the log at the second location; wherein the revising includes learning from one or more movement policies that moved content that was not accessed by the user.

4. The computer implemented method of claim 1 further comprising:
    monitoring the mobile device at a second location; and
    creating a second usage profile at the second location based on the monitoring and the usage profile.

5. The computer implemented method of claim 4 wherein the creation of the usage profile and the second usage profile includes creating a log on the mobile device that records information about application interaction on the mobile device at the first location and the second location; and wherein services are migrated to the second location based on the time frame the user profile dictates the services are used.

6. The computer implemented method of claim 1 where the observation of the mobile device's interaction with a set of resources includes monitoring applications on the mobile device; and wherein creating a usage profile includes performing analysis on the monitored applications to determine which resources which applications use, and, based on the analysis, ranking the resources by priority.

7. The computer implemented method of claim 1 further comprising:
    mining the mobile device for data that is associated with the future location of the mobile device;
    analyzing the mined data to determine a future location of the mobile device; and
    migrating a set of services according to the usage profile to the future location of the mobile device before the mobile arrives at the future location to enable the set of services to be ready when the mobile device arrives at the future location.

8. The computer implemented method of claim 1 further comprising:
monitoring the mobile device at a second location; and
creating a second usage profile at the second location based on the monitoring and using the second usage profile to determine what data and services should be migrated to the second location based on the second usage profile.

9. A system comprising:
one or more processors;
a mobile device;
resources; and
computer-executable program code operating in memory, wherein the computer-executable program code is configured to enable execution across one or more processors of:
observing a mobile device's interaction, in a first location, with a set of resources; wherein the set of resources include mobile data, data service, and processing capability;
recording the mobile device's interaction in a log on the user device;
creating a usage profile using the log for the set of resources based on the mobile device's interactions, in the first location, with the resources; wherein the resources are ranked by the type and frequency of interactions with the mobile device; wherein the usage profile includes a prediction of a sub-set of the set of resources will be used at a second location; wherein the usage profile dictates that the sub-set of the set of resources are to be migrated to a new location when the mobile device moves to the second location; wherein the usage profile includes information about what resources may be left behind and not transferred to the second location; wherein the usage profile includes information about the time frames when a user accesses a specific location; wherein the usage profile includes information when the mobile device is predicted to be in a particular new location for a period of time where the user profile dictates that not all of the set of resources should be transferred to the particular new location based on the period of time; and
sharing the log between the mobile device and the first and second data centers in an eventually consistent manner.

10. The system of claim 9 wherein the program code is further configured to enable the one or more processors to execute:
determining the mobile device has moved to a new location; and
applying the usage profile to enable intelligent migration of resources of the set of resources to the new location; wherein intelligent migration prioritizes resources based on which of the resources are predicted to be used at the new location; and migrating the resources that have been prioritized based on predicted use; wherein the resources include a set of services and a set of data; wherein resource movement for the mobile device is triaged with movement of other mobile devices determined to be moving to the same location.

11. The system of claim 9 wherein the program code is further configured to enable the one or more processors to execute:

mining the mobile device for data that is associated with the future location of the mobile device;
analyzing the mined data to determine a future location of the mobile device; and
migrating data according to the usage profile to the future location of the mobile device before the mobile arrives at the future location;
recording the mobile device's interaction, in the second location, with the set of resources in the log; and
revising the user profile based on recorded interaction in the log at the second location; wherein the revising includes learning from one or more movement policies that moved content that was not accessed by the user.

12. The system of claim 9 wherein the program code is further configured to enable the one or more processors to execute:
monitoring the mobile device at a second location; and
creating a second usage profile at the second location based on the monitoring and the usage profile.

13. The system of claim 12 wherein the creation of the usage profile and the second usage profile includes creating a log on the mobile device that records information about application interaction on the mobile device at the first location and the second location; and wherein services are migrated to the second location based on the time frame the user profile dictates the services are used.

14. The system of claim 9 where the observation of the mobile device's interaction with a set of resources includes monitoring applications on the mobile device; and wherein creating a usage profile includes performing analysis on the monitored applications to determine which resources which applications use, and, based on the analysis, ranking the resources by priority.

15. A program product comprising:
a non transitory computer-readable storage medium encoded with computer-executable program code enabling one or more processors to execute:
observing a mobile device's interaction, in a first location, with a set of resources; wherein the set of resources include mobile data, data service, and processing capability;
recording the mobile device's interaction in a log on the user device; and
creating a usage profile using the log for the set of resources based on the mobile device's interactions, in the first location, with the resources; wherein the resources are ranked by the type and frequency of interactions with the mobile device; wherein the usage profile includes a prediction of a sub-set of the set of resources will be used at a second location; wherein the usage profile dictates that the sub-set of the set of resources are to be migrated to a new location when the mobile device moves to the second location; wherein the usage profile includes information about what resources may be left behind and not transferred to the second location; wherein the usage profile includes information about the time frames when a user accesses a specific location; wherein the usage profile includes information when the mobile device is predicted to be in a particular new location for a period of time where the user profile dictates that not all of the set of resources should be transferred to the particular new location based on the period of time.

16. The computer product of claim 15 wherein the computer-executable program code further enables one or more processors to execute:

determining the mobile device has moved to a new location; and applying the usage profile to enable intelligent migration of resources of the set of resources to the new location; wherein intelligent migration prioritizes resources based on which of the resources are predicted to be used at the new location; and migrating the resources that have been prioritized based on predicted use; wherein the resources include a set of services and a set of data; wherein resource movement for the mobile device is triaged with movement of other mobile devices determined to be moving to the same location.

17. The computer product of claim 15 wherein the computer-executable program code further enables one or more processors to execute:

mining the mobile device for data that is associated with the future location of the mobile device;

analyzing the mined data to determine a future location of the mobile device; and migrating data according to the usage profile to the future location of the mobile device before the mobile arrives at the future location;

recording the mobile device's interaction, in the second location, with the set of resources in the log;

revising the user profile based on recorded interaction in the log at the second location; wherein the revising includes learning from one or more movement policies that moved content that was not accessed by the user; and sharing the log between the mobile device and the first and second data centers in an eventually consistent manner.

18. The computer product of claim 15 wherein the computer-executable program code further enables one or more processors to execute:

monitoring the mobile device at a second location; and creating a second usage profile at the second location based on the monitoring and the usage profile.

19. The computer product of claim 18 wherein the creation of the usage profile and the second usage profile includes creating a log on the mobile device that records information about application interaction on the mobile device at the first location and the second location; and wherein services are migrated to the second location based on the time frame the user profile dictates the services are used.

20. The computer product of claim 15 where the observation of the mobile device's interaction with a set of resources includes monitoring applications on the mobile device; and wherein creating a usage profile includes performing analysis on the monitored applications to determine which resources which applications use, and, based on the analysis, ranking the resources by priority.

* * * * *